(12) United States Patent
Soares (10) Patent No.: US 12,447,480 B2
(45) Date of Patent: Oct. 21, 2025

(54) AGRICULTURE DEVICE FOR DISPENSING A LIQUID

(71) Applicant: EXEL Industries, Paris (FR)

(72) Inventor: Simao Soares, Steenwijk (NL)

(73) Assignee: EXEL INDUSTRIES, Paris (FR)

( * ) Notice: Subject to any disclaimer, the term of this patent is extended or adjusted under 35 U.S.C. 154(b) by 402 days.

(21) Appl. No.: 18/021,666

(22) PCT Filed: Aug. 20, 2021

(86) PCT No.: PCT/EP2021/073168
§ 371 (c)(1),
(2) Date: Feb. 16, 2023

(87) PCT Pub. No.: WO2022/038274
PCT Pub. Date: Feb. 24, 2022

(65) Prior Publication Data
US 2024/0009689 A1    Jan. 11, 2024

(30) Foreign Application Priority Data

Aug. 20, 2020  (NL) ...................................... 2026315
Dec. 8, 2020   (NL) ...................................... 2027072

(51) Int. Cl.
*B05B 1/20* (2006.01)
*A01C 23/04* (2006.01)
(Continued)

(52) U.S. Cl.
CPC .............. *B05B 1/205* (2013.01); *B05B 12/04* (2013.01); *A01C 23/047* (2013.01); *A01M 7/0089* (2013.01)

(58) Field of Classification Search
CPC .. A01M 7/0089; A01C 23/007; A01C 23/047; B05B 1/20; B05B 1/202;
(Continued)

(56) References Cited

U.S. PATENT DOCUMENTS 4,392,611 A * 7/1983 Bachman ............ A01M 7/0089
                                                    222/617
4,530,463 A * 7/1985 Hiniker ............... A01M 7/0089
                                                    239/71
(Continued)

FOREIGN PATENT DOCUMENTS

BE       1014341 A3   9/2003
EA       022079 B1   10/2015
(Continued)

OTHER PUBLICATIONS

International Search Report and Written Opinion mailed Oct. 22, 2021, for Application No. PCT/EP2021/073168 (16 pages).

*Primary Examiner* — Darren W Gorman
(74) *Attorney, Agent, or Firm* — KDW Firm PLLC (57) ABSTRACT

An agricultural device includes a boom having a supply line for transporting liquid product and nozzles along the boom, each nozzle operatively connected to the supply line. A liquid product supply is connected to the supply line for supplying the liquid product to be sprayed. A pressure regulation unit includes a nozzle controller for controlling opening and closing of a nozzle. A speed detector measures speed of the device. The pressure regulation unit and/or the nozzle controller calculate nozzle timing data for each nozzle including a spraying frequency and a maximum closing time. The speed is provided to the pressure regulation unit and/or the nozzle controller for calculation of nozzle operation data. The nozzle controller operates each of the nozzles based on the calculated nozzle timing data and the maximum closing time is not exceeded to obtain a homogeneous spraying of the liquid product over a surface of a field.

20 Claims, 5 Drawing Sheets

(51) Int. Cl.
 *A01M 7/00* (2006.01)
 *B05B 12/04* (2006.01)
(58) Field of Classification Search
 CPC ........... B05B 1/205; B05B 9/06; B05B 12/04; B05B 12/16
 See application file for complete search history.

(56) References Cited

U.S. PATENT DOCUMENTS

| | | | | |
|---|---|---|---|---|
| 4,637,547 | A | * | 1/1987 | Hiniker .................. B05B 12/00 239/69 |
| 5,704,546 | A | * | 1/1998 | Henderson .......... A01M 7/0089 239/69 |
| 5,768,823 | A | * | 6/1998 | Nelson .................... G01S 17/04 47/1.01 R |
| 2006/0273189 | A1 | | 12/2006 | Grimm et al. |
| 2012/0228395 | A1 | * | 9/2012 | Needham .............. B05B 12/087 239/11 |
| 2013/0153676 | A1 | * | 6/2013 | Ballu ................... A01C 23/047 239/11 |
| 2016/0015020 | A1 | * | 1/2016 | Needham ............ A01M 7/0089 239/159 |
| 2016/0175869 | A1 | * | 6/2016 | Sullivan .............. A01M 7/0042 239/11 |
| 2017/0348718 | A1 | | 12/2017 | Preheim et al. |

FOREIGN PATENT DOCUMENTS

| | | |
|---|---|---|
| EP | 1346637 A1 | 9/2003 |
| GB | 2551345 A | 12/2017 |
| WO | 2012022903 A1 | 2/2012 |

\* cited by examiner

AGRICULTURE DEVICE FOR DISPENSING A LIQUID

This application is a national stage filing under 35 U.S.C. 371 of pending International Application No. PCT/EP2021/073168, filed Aug. 20, 2021, which claims priority to Netherlands Patent Application No. 2026315, filed Aug. 20, 2020, and also claims priority to Netherlands Patent Application No. 2027072, filed Dec. 8, 2020, the entirety of which applications are incorporated by reference herein.

The present invention relates to a device and a method for dispensing a liquid product over a surface to be sprayed, such as an agricultural field. The present invention is applicable in the agricultural field in order to spray a field with a liquid phytosanitary product, such as a fertilizer or a pesticide, or other product type.

Agriculture devices for dispensing a liquid over a surface of a field, such as an agricultural field, are known from practice. Such devices comprise a spray boom or, in short, a boom comprising a number of consecutive pipes or ducts for transporting the liquid to be sprayed. The consecutive pipes together are connected to a (longitudinal) section of the boom. A supply line is connected to the boom and extends from a liquid product supply along the longitudinal length of the boom. The supply line is connected via junctions with sub-supply line that extend from the boom to the pipe sections and to spray nozzles that are positioned thereon. The nozzles are adapted to spray the liquid product on a target, which is generally the ground or plants on an agricultural field. Often, the distance between the nozzles and the targeted object is approximately 25, 37.5, or cm to obtain a good result.

During operation, liquid product is extracted from a product supply, such as a container, and subsequently pumped via the longitudinal supply lines formed by the pipes to the spray nozzles, or nozzles.

Generally, the pump is coupled to a bypass valve so as to bring the liquid product upstream of the supply conduits to a pressure proportional to the square of the speed of travel of the boom on the agricultural field, intended to ensure a more or less constant overall flow rate of sprayed liquid product per treated surface unit. Often, such bypass valves are positioned in or on the pipe sections that form the supply line. A conventional boom may be up to 36 m long, or even 55 m. On a flat agricultural field, the boom is also horizontal and all of the nozzles are situated at the same height relative to the ground.

The amount of liquid product needed to be sprayed often differs depending on different factors such as crop type, soil type, crop size, crop age, weed types, weather, previous treatments etc. Therefore, a known device generally include means for adjusting the amount of liquid to be sprayed. A known solution is to close the nozzles during spraying for some periods to ensure that no abundance of the liquid product is applied.

A disadvantage of this solution is that this causes an uneven coverage of the surface of the field that is sprayed, since the closing of the nozzles results in parts of the surface not being sprayed.

The present invention aims to obviate or at least significantly reduce the aforementioned problems by providing a more accurate device and method for dispensing a liquid product in a more even fashion.

To that end, the invention provides an agricultural device for dispensing a liquid product over a surface to be sprayed, such as an agricultural field comprising:

at least one boom comprising a longitudinal supply line for transporting the liquid product and a plurality of nozzles that are positioned along the boom, wherein each nozzle is operatively connected to the longitudinal supply line;

a liquid product supply that is connected to the longitudinal supply line for supplying to the longitudinal supply line the liquid product to be sprayed;

at least one pressure regulation unit including at least one nozzle controller that is configured for controlling the opening and closing of one or more associated nozzles;

a speed detector that is configured to measure movement speed of the agricultural device; and, wherein the at least one pressure regulation unit and/or the at least one nozzle controller is configured to calculate nozzle timing data for each associated nozzle, the nozzle timing data at least containing a spraying frequency (Sfreq) and a maximum closing time (Tmax), wherein the movement speed is provided to the at least one pressure regulation unit and/or the nozzle controller to be included as calculation input for calculation of the nozzle operation data and wherein the nozzle controller is further configured to operate each of the one or more associated nozzles based on the calculated nozzle timing data and wherein, preferably the at least one pressure regulation unit and/or the at least one nozzle controller is configured to calculate the nozzle timing data such that, the maximum closing time is not exceeded to obtain a homogeneous spraying of the liquid product over a surface of a field to be sprayed.

It is noted that the spraying frequency comprises the frequency with which a nozzle opens and closes.

It is further noted that the frequency might comprise a single frequency, a sum of two or more frequencies and/or an irregular frequency. The two or more frequencies may have different periods, shifts, amplitudes etcetera, and/or the sum of two or more frequencies may appear regular or irregular. The irregular frequency may depend on the lay-out of the surface to be sprayed and/or the placement of crops to be sprayed and may therefore also be an irregular frequency that for example is coupled to the field and/or crops to be sprayed in combination with the distance of the nozzle(s) from the liquid product supply.

It is noted that in the agricultural device according to the invention, the closing time and the opening time largely determine the amount of liquid that is sprayed at a certain position. This essentially means that the closing/opening time, also referred to in the application as open/close time or close/open time, is used to obtain the homogeneous spraying of the liquid product.

An advantage of the agricultural device according to the invention is that, due to the fact that the outflow of the nozzles is regulated by operating the open/close time of the nozzles, and that the maximum closing time is not exceeded, the parts of the surface not being sprayed are reduced or non-existent. Thus, a more homogeneous coverage of the surface with the liquid product is achieved.

It is noted that according to the invention the singular use of nozzle might refer to a single nozzle or a group of associated nozzles from the plurality of nozzles.

In an embodiment of the invention the at least one pressure regulation unit and/or the nozzle controller are configured to determine a maximum opening time (Topen), wherein the maximum opening time comprises a maximum duration each of the plurality of nozzles can be opened such that a minimum pulse frequency is met.

An advantage of this embodiment is that by determining the maximum opening time a maximum amount of liquid to be sprayed is not exceeded.

In an embodiment of the invention the at least one pressure regulation unit and/or the nozzle controller are configured to determine the spraying frequency (Sfreq), maximum opening time (Topen) and/or maximum closing time (Tmax) at least partly based on the movement speed of the agricultural device when calculating the nozzle timing data for each associated nozzle.

An advantage of this embodiment is that the maximum closing time and spraying frequency can be adapted according to the movement speed of the agricultural device.

In an embodiment of the invention the at least one pressure regulation unit and/or the nozzle controller are configured to determine the spraying frequency (Sfreq), the maximum opening time (Topen), and/or maximum closing time (Tmax) at least partly based a spraying area of each of the plurality of nozzles, wherein the spraying area relates to the area of the field which is sprayed when the nozzle is opened.

It is noted that the spraying area may be detected and/or calculated based on nozzle type, driving speed, wind speed, nozzle height relative to the ground and/or various other factors.

In an embodiment the spraying frequency (Sfreq) ranges between 2 and 100 Hertz and preferably between 10 and 50 Hertz.

In an embodiment according to the invention the at least one pressure regulation unit is configured to maintain a constant pressure in the longitudinal supply line.

In an embodiment of the invention, the detection of the movement speed of the agricultural device further comprises detecting a nozzle movement speed of each of the plurality of nozzles and wherein the at least one pressure regulation unit and/or the nozzle controller are configured to determine the spraying frequency (Sfreq) and/or maximum closing time (Tmax) of each of the plurality of nozzles further based on their respective associated nozzle movement speed. The nozzle movement speed can be determined with a nozzle movement speed sensor and/or can be calculated with a nozzle movement speed algorithm using the speed data of the device and position data of the respective nozzle in relation to the device.

An advantage of this embodiment is that the spraying frequency (Sfreq) and/or maximum closing time (Tmax) are adapted according to the circumstances of each individual nozzle. This is especially relevant when, for example, the agricultural device is turning/making a bend. In this case, nozzles that are located on the inside of the turn/bend will have a relatively lower speed as nozzles that are located on the outside of the turn/bend.

In an embodiment of the invention determining the maximum closing time (Tmax) by the at least one pressure regulation unit and/or the at least one nozzle controller comprises decreasing the maximum closing time (Tmax) in correspondence with an increase in the moving speed and increasing the maximum closing time (Tmax) in correspondence with a decrease in the movement speed.

An advantage of this embodiment is that the maximum closing time (Tmax) is easily adapted to the movement speed of the nozzles and/or agricultural device.

In an embodiment of the invention the at least one pressure regulation unit and/or the nozzle controller are configured to adapt the nozzle timing data for individual nozzles of at least a part of the plurality nozzle such that at least a part of the nozzles pulses asynchronously.

An advantage of this embodiment is that a water hammer effect which is caused by the plurality of nozzles opening and closing is reduced, since less nozzles open and close at the same time. This makes the spraying more stable and reduces wear and tear of different components of the agricultural device.

It is noted that according to the invention asynchronously comprises different nozzles pulsing at a different moment in time, e.g. not in sync. It is noted that the opening of the nozzles may overlap but that the opening and closing of the nozzles occurs at a different moment.

This further reduces, or obviates completely, the risk of all nozzles being closed at once in operation of the device.

In an embodiment of the invention the at least one pressure regulation unit and/or the nozzle controller are configured to add a random delay to the nozzle timing data of each of the plurality of nozzles.

An advantage of this embodiment is that due to the random delay, the changes of two nozzles opening and closing simultaneously are relatively small and thus the water hammer effect is reduced efficiently for example by increasing and/or decreasing the spraying frequency (Sfreq) of each of the plurality of nozzles.

It is noted that the increase and/or decrease ranges between 0 and 5 hertz and preferably between 0 and 2 hertz.

In an embodiment of the invention the random delay is picked from a random generator, for example a white noise generator. This provides a "real" random delay. Alternatively, each nozzle or group of nozzles have an associated set random offset which does not change between pulses. In is noted that an amount of noise is variable.

In an embodiment of the invention the random delay has an upper limit. This prevents delays being too large (as result of being in the "tail" of the distribution).

In an embodiment of the invention, when in use, the nozzle timing data of each of the plurality of nozzles is out of phase compared to the other nozzles. This has the effect that each of the nozzles will open at a slightly different time as the other nozzles.

An advantage of this embodiment is that the water hammer effect is reduced in a straight forward and easy manner.

In an embodiment of the invention, when in use, the nozzle timing data of each of the plurality of nozzles comprises a different spraying frequency (Sfreq) compared to the other nozzles. This has the effect that each of the nozzles will open at a slightly different time as the other nozzles.

An advantage of this embodiment is that the water hammer effect is reduced in a straight forward and easy manner.

Another advantage is that, due to the difference in spraying frequency between the different nozzles, variations in the crop density in the field (measured along the boom length) may be equalized with regard to the amount of liquid to be sprayed. In other words, the amount of sprayed liquid may be similar for each crop even if the crop density in the field differs along the boom length.

In an embodiment of the invention the plurality of nozzles is divided into nozzle groups, wherein for each of the nozzle groups the nozzle timing data is equal for all nozzles in said nozzle group.

An advantage of this embodiment is that the water hammer effect is still reduced while the calculation of the nozzle timing data is computational less expensive.

In an embodiment of the invention the at least one pressure regulation unit and/or the nozzle controller are configured to temporarily disable one or more nozzles in accordance with an amount of liquid to be sprayed. It is noted that each nozzle of the plurality of nozzles has a spraying area.

An advantage of this embodiment is that the amount of liquid to be sprayed can be further reduced, without exceeding an average maximum closing time of the plurality of nozzles.

This is especially advantage when the spraying areas of nozzles overlap. In this case nozzles can be temporarily disabled without creating areas that are not sprayed due to said disabling.

In an embodiment of the invention the plurality of nozzles comprises duo fan nozzles that comprises a first nozzle head that is configured to spray in a first direction and a second nozzle head that is configured to spray in a second direction, and wherein the first direction is approximately in a forward moving direction of the agricultural device and wherein the second direction is approximately in a backward moving direction of the agricultural device.

An advantage of this embodiment is that a larger surface of the field to be sprayed can be sprayed at once by one nozzle.

In an embodiment of the invention the calculation of the nozzle timing data for each associated nozzle by the at least one pressure regulation unit and/or the at least one nozzle controller further comprises adapting the nozzle timing data to minimize an overlap between a spraying target of the first nozzle head and a spraying target of the second nozzle head.

An advantage of this embodiment is that by adapting the nozzle timing data to minimize an overlap between the respective spraying targets, the surface at the point of overlap is not over saturated with the liquid product.

In an embodiment of the invention each of the plurality of nozzles are configured to spray with a non-homogeneous droplet size and wherein the maximum closing time is further determined by the at least one pressure regulation unit and/or the at least one nozzle controller according to a size of a spraying area corresponding to each of the plurality of nozzles.

An advantage of having a non-homogeneous droplet size is that smaller droplets tend to stay longer in the air compared to larger droplets and thus travels further. Therefore, a larger surface of the field is covered by one spraying cycle of the nozzle.

An additional advantage is that a larger surface of the field that is covered by one spraying cycle of the nozzle allows for an increase in the maximum closing time (Tmax).

In an embodiment of the invention the maximum closing time and/or spraying frequency are further determined by the at least one pressure regulation unit and/or the at least one nozzle controller in accordance to a wind speed and a wind direction. The wind speed and the wind direction can influence the spraying area of the nozzles causing uneven distribution of the liquid product. The wind speed and the wind direction can be determined from one or more sensors associated with the device and/or can be forwarded to the device by an external source.

An advantage of this embodiment is that the influence of the wind may be reduced.

In an embodiment of the invention, the nozzle controller comprises a number of electro-valves, wherein each electro-valve is associated with one or a number of nozzles, where each electro-valve is configured for receiving the nozzle operation data for setting the opening and the closing of the associated nozzles.

The use of electro-valves in the nozzle controller provides several advantages over traditional valves. An advantage of electro-valves is that they are low-maintenance and have a high reliability. Another advantage of electro-valves is that have a low power use and have a continuous control range, rather than only an on/off regulation.

In an embodiment according to the invention, the electro-valves may be connected to each other via a communication system or bus.

In a preferred embodiment the bus comprises a CAN bus.

For the purpose of the invention, it is noted that a CAN-bus is a Controller Area Network-bus, which is used to provide a reliable device to allow and control communication, i.e. signals, between the different electro-valves.

By providing a CAN-bus connection between the electro-valves, a robust, reliable and relatively low cost connection is established. In addition, the use of a CAN-bus connection reduces the need for (copper) wiring, which reduces weight of the agricultural device.

In an embodiment according to the invention, the electro-valves may be controlled with a PWM signal according to a Duty Cycle (DC) formula, wherein the Duty Cycle formula is defined as $DC=T1/(T1+T2)$, wherein $T1$ is a closing time of a nozzle and $T2$ is an opening time of the nozzle.

For the purpose of the invention, it is noted that PWM is Pulse-Width Modulation. PWM provides the advantage that it modulates the signal to the valves in a cost-effective manner.

In an embodiment of the invention each of the plurality of nozzles comprises a coil structure and wherein the nozzle controller is configured to control the opening and closing of the nozzle by switching a direction of an electric current through the coil in accordance with the nozzle timing data and wherein each of the plurality of nozzles may further comprise a spring that is configured to assist the closing of said nozzle.

An advantage of this embodiment is that a speed with which the nozzles can be controlled is increased since the time it takes to open and close the nozzle is reduced by switching the direction of the electric current.

In an embodiment of the invention each of the plurality of nozzles comprises an opening coil and a closing coil, wherein the nozzle controller is configured to control the opening and closing of the nozzle by alternating between activating the opening coil and activating the closing coil in accordance with the nozzle timing data.

In an embodiment of the invention, each of the plurality of nozzles is moveable between an open position and a closed position and comprises an opening solenoid and a spring, wherein the spring is biased to hold the nozzle in the closed position, wherein the nozzle controller is configured to control the opening of the nozzle by activating and deactivating the opening solenoid in accordance with the nozzle timing data, and wherein activation of the opening solenoid forces the nozzle to overcome the bias of the spring to open the nozzle during activation of the opening solenoid.

In an embodiment of the invention the at least one pressure regulator and/or nozzle controller are further configured to observe a current, an electrical resistance and/or the voltage needed to open and/or close the electro-valves and wherein a maintenance signal is presented to a user of the agricultural device when the current, electrical resistance and/or the voltage is outside a predefined range.

In an embodiment of the invention the observed current, electrical resistance and/or the voltage are saved in memory and analyzed in a predictive maintenance setup.

It is noted that the above two embodiments may exist as a separate invention.

An advantage of this embodiment is that a speed with which the nozzles can be controlled is increased since the time it takes to open and close the nozzle is by having a separate coil for each action.

In an embodiment of the invention the agricultural device is a self-propelled vehicle, and wherein the device comprises:
- a number of wheels;
- at least one angle sensor that is operatively connected to a steerable wheel of the number of wheels wherein the at least one angle sensor is configured to measure a wheel angle of the associated wheel with respect to a central axis that extends from a rear end to a front end of the vehicle substantially parallel to a moving direction, and wherein the at least one angle sensor is further configured to transmit the angle data to the nozzle controller to be included as calculation input for calculation of the nozzle operation data.

An advantage of this embodiment is that the movement speed of each individual nozzle can be easily determined using the wheel angle and the moving speed.

In an embodiment of the invention the device is a vehicle to be towed by another vehicle.

The invention further relates to a method for spraying a field, comprising of providing an agricultural device according to any one of the previous claims and controlling the agricultural device to spray the field.

This method has the same advantages as the various embodiments described above.

The invention further relates to computer implemented method for controlling an agricultural device according to any one above embodiments, the method at least comprising the steps of:
- observing an amount of liquid to be sprayed;
- observing a movement speed of the agricultural device;
- calculating nozzle timing data at least comprising a spraying frequency and a maximum closing time in accordance with the observed amount of liquid to be sprayed and the observed movement speed;
- controlling the opening and closing of the plurality of nozzles in accordance with the nozzle timing data using the at least one pressure regulator and/or nozzle controller.

The computer implemented method has the same advantages as the various embodiments described above.

The invention is described in the foregoing as example. It is understood that those skilled in the art are capable of realizing different variants of the invention without actually departing from the scope of the invention. Further advantages, features and details of the invention are elucidated on the basis of preferred embodiments thereof, wherein reference is made to the accompanying drawings, in which:

Agricultural device 2 according to an example of the invention (see FIGS. 2a, 2b) shows self-propelled device 2 that is provided with wheels 4a, 4b, 4c, 4d that are connected to a drive assembly (not shown) and with driver cabin 6 from which an operator can control agricultural device 2. Agricultural device 2 further comprises liquid product supply 8 in the form of storage tank 8 in which liquid product that is to be dispensed over a surface S is provided. In this example, agricultural device 2 comprises two booms 10, 12. Boom 10 is provided with longitudinal supply line 14 and a plurality of nozzles 18a-18x which are distributed along boom 10. Each of the nozzles 18a-18x is fluidly connected with longitudinal supply line 14 of boom 10, which longitudinal supply line 14 has end portion 22 that is fluidly connected with liquid product supply 8.

Figure 2A:
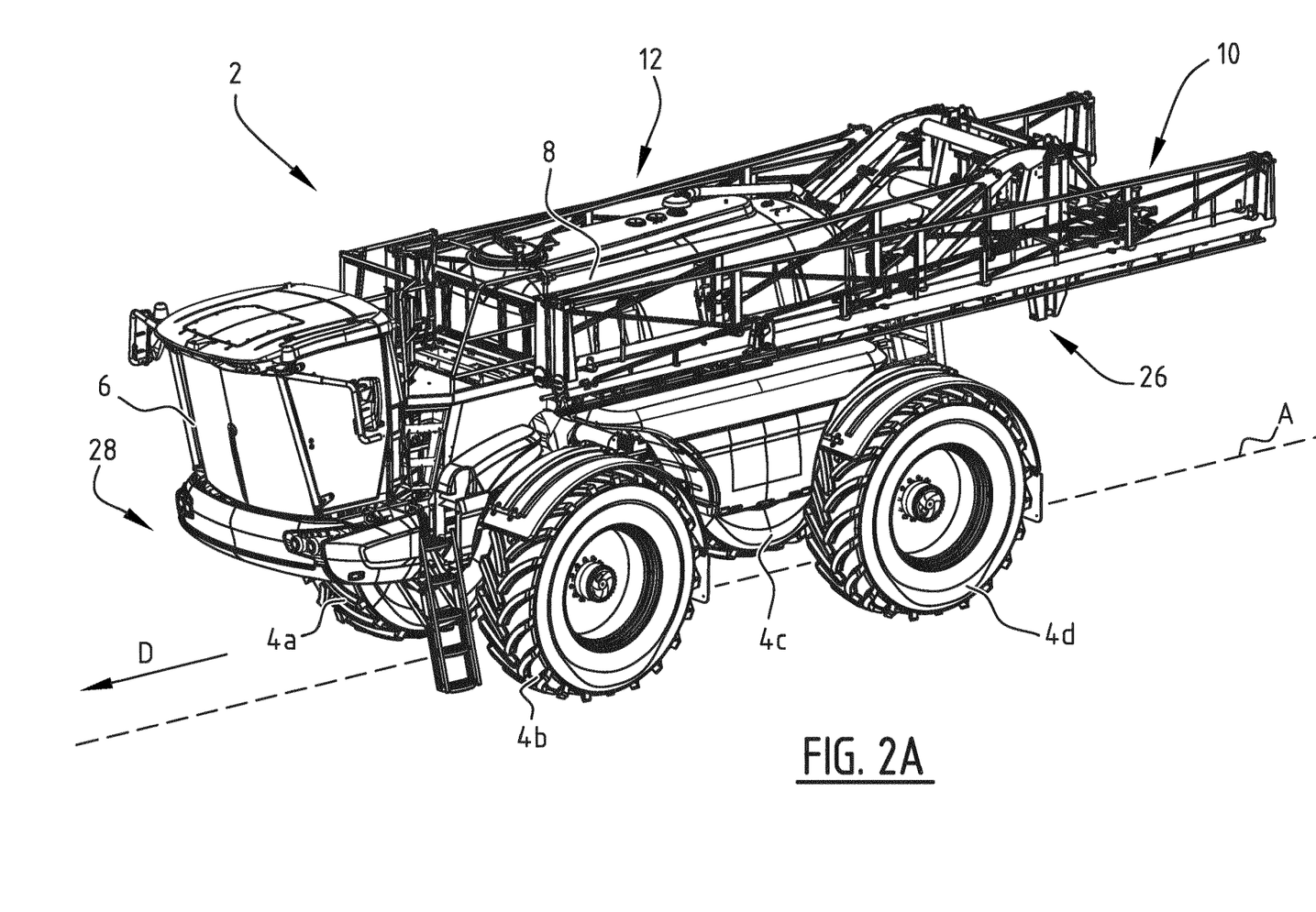
FIG. 2a shows a perspective view of an example of an agricultural device according to the invention.
Figure 2B:
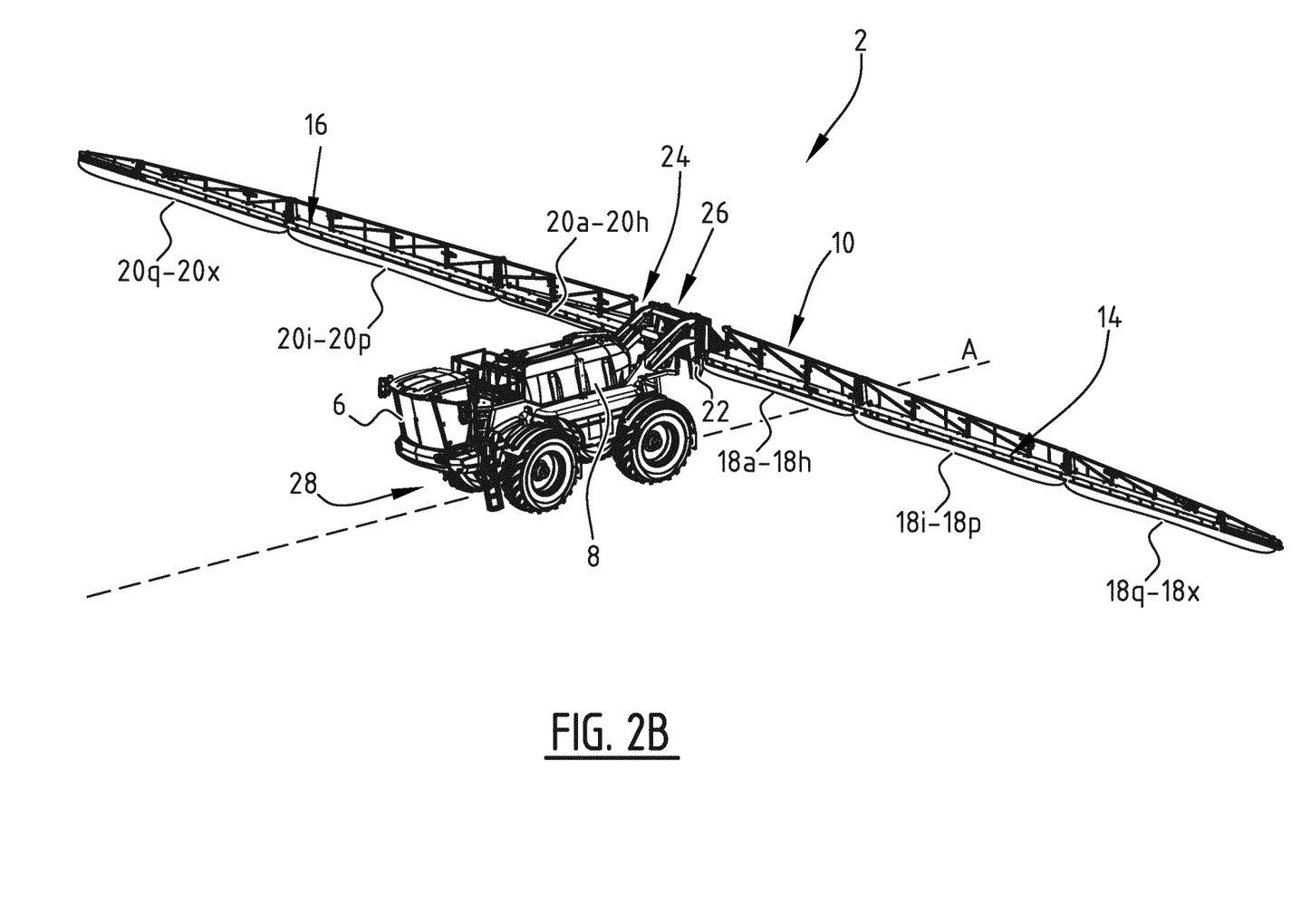
FIG. 2b shows the device of FIG. 1 in which the booms are extended.

Boom 12 is provided with longitudinal supply line 16 and a plurality of nozzles 20a-20x which are distributed along boom 12. Each of the nozzles 20a-20x is fluidly connected with longitudinal supply line 16 of boom 12, which longitudinal supply line 16 has end portion 24 that is fluidly connected with liquid product supply 8.

Agricultural device 2 further comprises pressure regulation means 54 (see FIG. 1), which include at least one nozzle control unit 56 to control the opening and closing of one or more of associated nozzles 18a-18x, 20a-20x on respective booms 10, 12.

Figure 1:
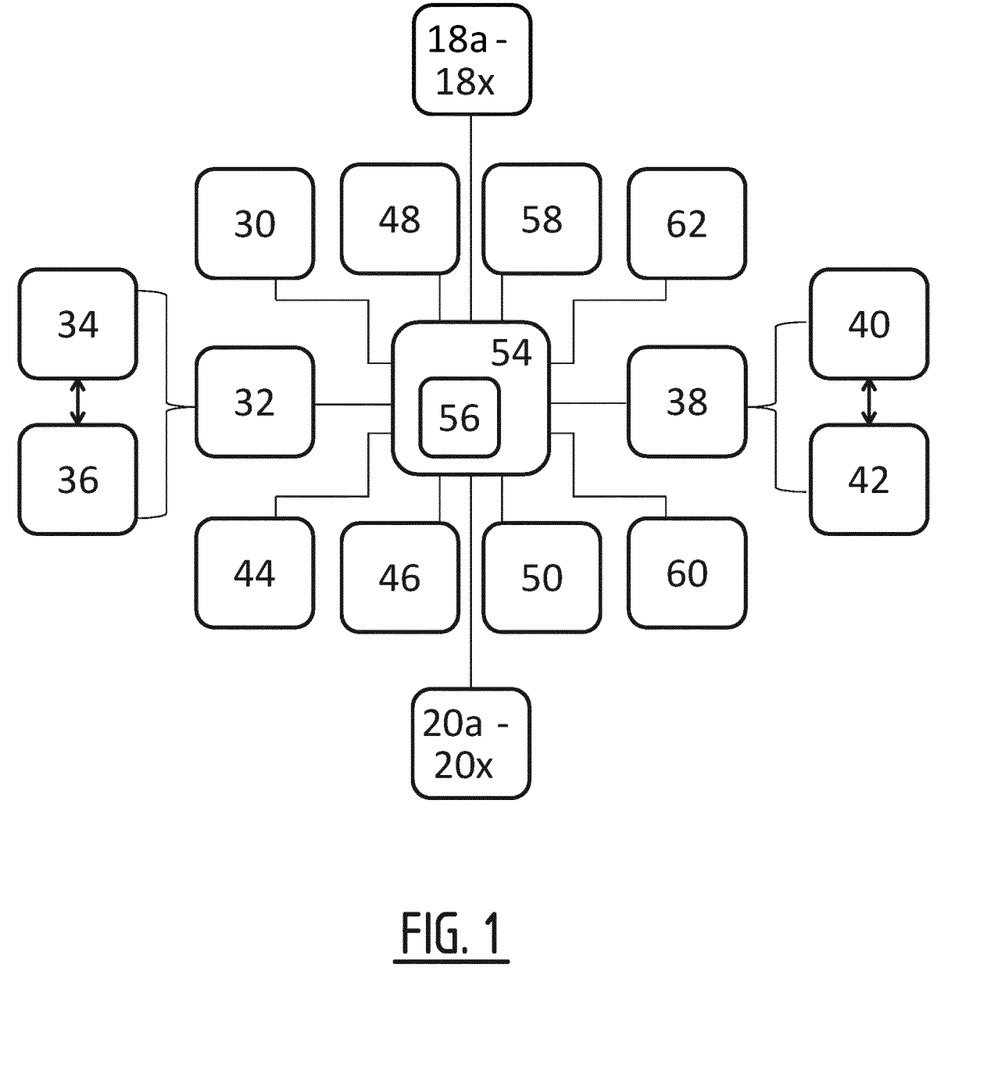
FIG. 1 shows a schematic overview of different components of the device.

Agricultural device 2 further comprises speed detector 58 which is configured for detecting the movement speed of the agricultural device 2.

In this example agricultural device 2 also comprises positioning system 30 that is configured to provide real-time position data to the device, most notably to pressure regulation unit 54 and/or nozzle control unit 56, that is used in calculating which of nozzles 18a-18x, 20a-20x needs to be operated at a specific time to dispense liquid on the field.

Pressure regulation unit 54 and/or nozzle control unit 56 are configured to calculate nozzle timing data for each associated nozzle 18a-18x, 20a-20x. The nozzle timing data at least contains a closing time (T1), an opening time (T2), and a maximum closing time Tmax and an opening/closing spraying frequency (Sfreq) for each of the associated nozzles 18a-18x, 20a-20x and is calculated based on a calculation input. The calculation input at least includes the movement speed detected by speed detector 58. Closing time T1 and opening time T2 related to the Duty Cycle (DC) formula, wherein the Duty Cycle formula is defined as DC=T1/(T1+T2). Here the DC corresponds with the amount of liquid to be sprayed relative to the maximum amount of liquid that agricultural device is capable of spraying during one duty cycle when opening time T2 is one and closing time T2 is zero. To ensure homogeneous coverage of surface S of field 40 pressure regulation unit 54 and/or nozzle control unit 56 are configured to calculate nozzle timing data including calculating maximum closing time Tmax, wherein maximum closing time Tmax relates to a time agricultural device can travel without spraying while maintaining the homogeneous spraying coverage given the movement speed of agricultural device 2. Pressure regulation unit 54 and/or nozzle control unit 56 are configured to calculate closing time T1 such that it does not exceed maximum closing time Tmax. In case T1 approached Tmax, spraying frequency Sfreq is increased and T1 is decreased.

Nozzle controller 56 is further configured to operate each of associated nozzles 18a-18x, 20a-20x based on the calculated nozzle timing data to obtain a homogeneous spraying of the liquid product over a surface of a field to be sprayed.

Figure 3A:
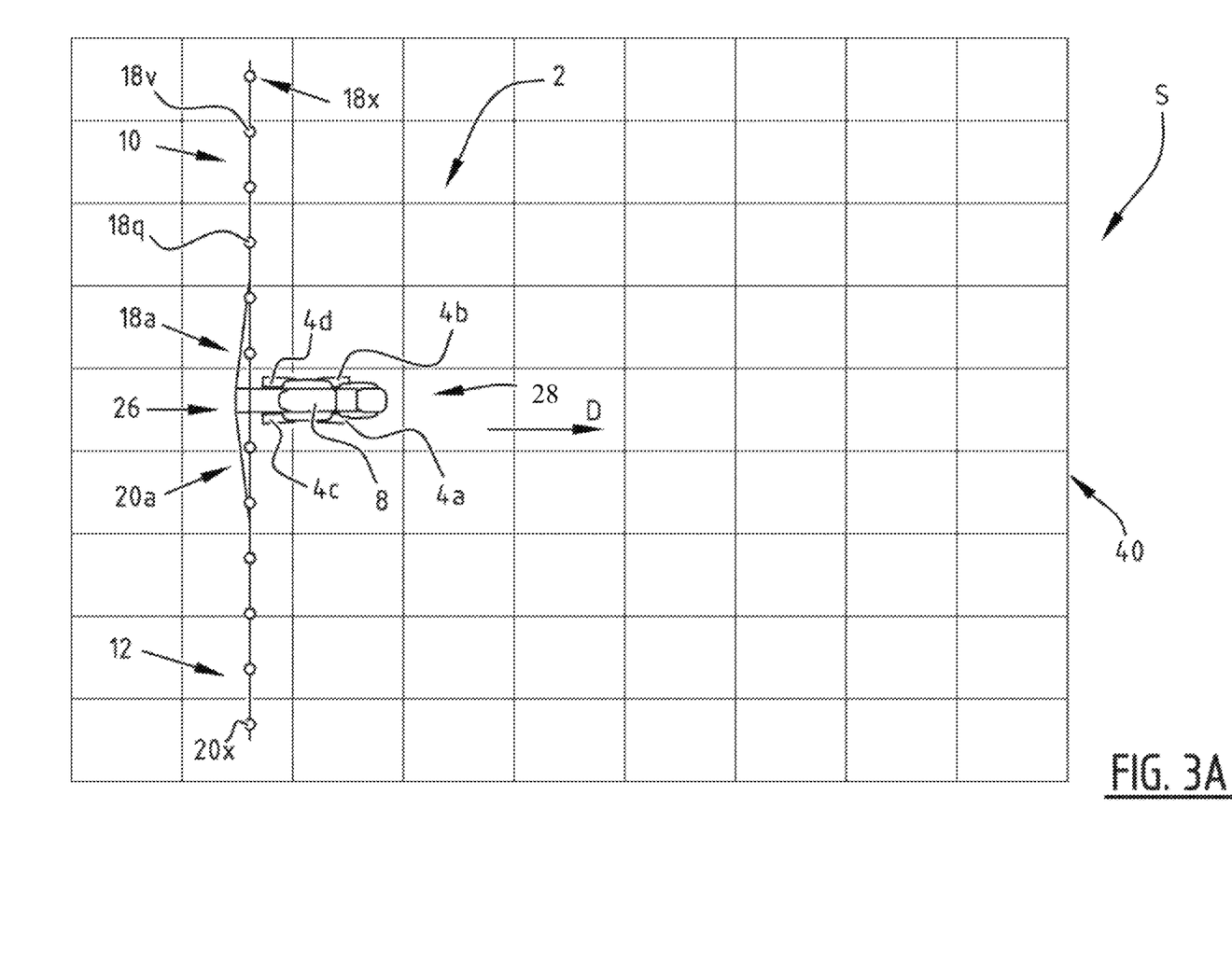
FIGS. 3a-3b show a schematic overview of the device of FIG. 2 during operation.
Figure 3B:
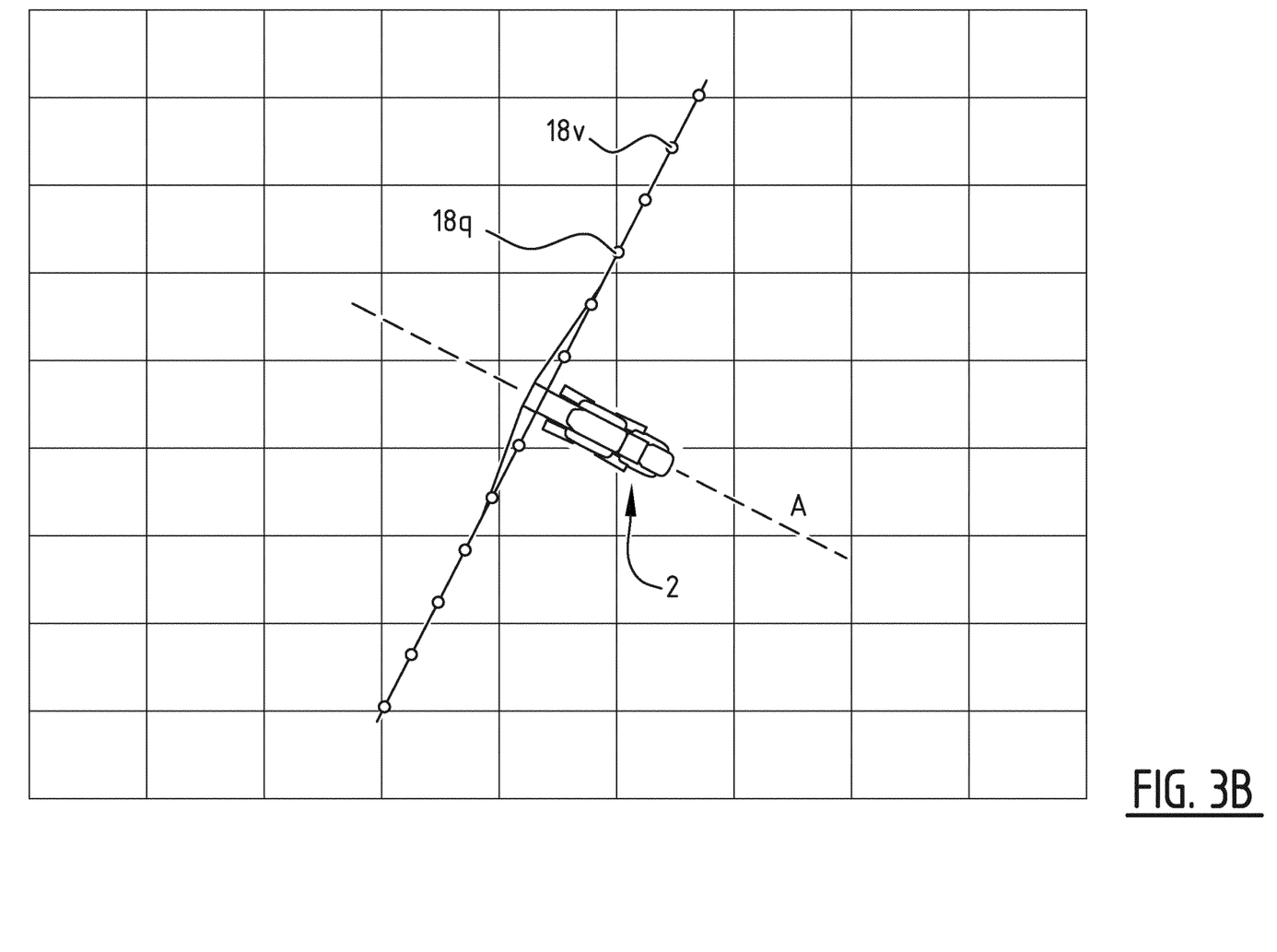

Agricultural device 2 in this example also comprises detection system 32 that includes a plurality of cameras 34 and image processor 36 for processing the images captured with cameras 34. The processed images are subsequently sent from image processor 36 or detection system 32 to map generator 38 that generates raster-based representation 40 having plurality of raster elements 42. Each raster element 42 represents a part of surface S of the field (see FIGS. 3a-3b) to be sprayed which has an associated amount of liquid to be sprayed.

In this example (see FIG. 1) device 2 also comprises communication device 44 that is operatively connected to memory 46 and to pressure regulation unit 54 and, thus, nozzle control unit 56, and user interface 48 that is configured to enable a user or operator to provide input and control device 2. The operator may follow the operations on display 50, on which in this example the specific information on the operation of the different nozzles at different times is represented. Naturally, other information regarding the operation of agricultural device 2 may also be provided on display 50.

In this example, booms 10, 12 each are foldable between a storage position (see FIG. 2a) and a spray position (see FIG. 2b). In the active position, booms 10, 12 extend outwardly on opposite sides from the agricultural device 2 (see FIG. 2b). In this position, booms 10, 12 extend substantially perpendicular to a central axis A, which central axis A extends substantially parallel to moving direction D from rear end 26 to front end 28 of device 2. In the storage position, each of booms 10, 12 is rotated inwardly over an angle of about 90° and folded, such that each of booms 10, 12 extends at least partially parallel to central axis A of agricultural device 2 (see FIG. 2a).

In this example (see FIG. 1) device 2 also comprises communication device 44 that is operatively connected to memory 60 and to pressure regulation unit 54 and, thus, nozzle control unit 56, and user interface 48 that is configured to enable a user or operator to provide input and control device 2. The operator may follow the operations on display 50, on which in this example the specific information on the operation of the different nozzles at different times is represented. Naturally, other information regarding the operation of agricultural device 2 may also be provided on display 50.

In this example agricultural device further comprises wind detector 62 which is configured to detect a wind speed and wind direction and communicate these wind measurements to pressure regulation unit 54 and/or nozzle control unit 56. Pressure regulation unit 54 and/or nozzle control unit 56 are further configured to partly base the calculation of Tmax on the wind measurements.

In operation of device 2, of which an example is shown in FIGS. 2a-2b, device 2 moves in direction D along surface S of the field, meanwhile spraying with different nozzles 18a-18x, 20a-20x, on various raster elements 42 of raster based representation 40 that are in practice various sub-parts of field F. It is noted that for clarity the raster elements are visualized much larger as they are in practice.

In operation pressure regulation unit 54 and/or nozzle control unit 56 calculate opening time T2, closing time T1, maximum closing time Tmax and spraying frequency Sfreq based on movement speed of different nozzles 18a-18x, 20a-20x and their corresponding spraying area (not shown). As the agricultural device moves in a constant forward motion all nozzles have the same movement speed. Therefore pressure regulation unit 54 and/or nozzle control unit 56 adds a random value to the spraying frequency Sfreq of the different nozzles 18a-18x, 20a-20x. It is noted that a different random number is generate for each individual nozzle.

In operation the user of agricultural device 2 takes a turn (FIG. 3b) which causes nozzles 18a-18x, 20a-20x to have a different moving speed relative to each other. In response pressure regulation unit 54 and/or nozzle control unit 56 recalculates the nozzle timing data for each nozzle. Due to the difference in moving speed, spraying frequency Sfreq differs slightly for each nozzle. Therefore pressure regulation unit 54 and/or nozzle control unit 56 does not add a random value to the spraying frequency Sfreq of the different nozzles 18a-18x, 20a-20x.

The present invention is by no means limited to the above described preferred embodiments thereof. The rights sought are defined by the following claims within the scope of which many modifications can be envisaged.

The invention claimed is:

1. An agricultural device for dispensing a liquid product over a surface to be sprayed, the device comprising:
    at least one boom comprising a longitudinal supply line for transporting the liquid product and a plurality of nozzles that are positioned along the boom, wherein each nozzle is operatively connected to the longitudinal supply line;
    a liquid product supply that is connected to the longitudinal supply line for supplying to the longitudinal supply line the liquid product to be sprayed;
    at least one pressure regulation unit including at least one nozzle controller that is configured for controlling the opening and closing of one or more associated nozzles;
    a speed detector that is configured to measure movement speed of the agricultural device; and,
    wherein the at least one pressure regulation unit is configured to calculate nozzle timing data for each associated nozzle, the nozzle timing data at least containing a spraying frequency (Sfreq) and a maximum closing time (Tmax),
    wherein the movement speed is provided to the at least one pressure regulation unit to be included as calculation input for calculation of the nozzle timing data, and
    wherein the at least one nozzle controller is further configured to operate each of the one or more associated nozzles based on the calculated nozzle timing data and wherein the maximum closing time is not exceeded to obtain a homogeneous spraying of the liquid product over a surface of a field to be sprayed.

2. The agricultural device according to claim 1, wherein the at least one pressure regulation unit is configured to determine the spraying frequency (Sfreq) and/or the maximum closing time (Tmax) at least partly based on the movement speed of the agricultural device when calculating the nozzle timing data for each associated nozzle.

3. The agricultural device according to claim 1, wherein the detection of the movement speed of the agricultural device further comprises detecting a nozzle movement speed of each of the plurality of nozzles and wherein the at least one pressure regulation unit is configured to determine the spraying frequency (Sfreq) and/or maximum closing time (Tmax) of each of the plurality of nozzles further based on their respective associated nozzle movement speed.

4. The agricultural device according to claim 2, wherein determining the maximum closing time (Tmax) comprises decreasing the maximum closing time in correspondence with an increase in the moving speed and increasing the maximum closing time in correspondence with a decrease in the movement speed.

5. The agricultural device according to claim 1, wherein the at least one pressure regulation unit is configured to adapt the nozzle timing data for each associated nozzle such that each nozzle pulses asynchronously.

6. The agricultural device according to claim 5, wherein the at least one pressure regulation unit is configured to add a random delay to the nozzle timing data of each of the plurality of nozzles.

7. The agricultural device according to claim 5, wherein the nozzle timing data of each of the plurality of nozzles is out of phase compared to the other ones of the plurality of nozzles.

8. The agricultural device according to claim 1, wherein the plurality of nozzles is divided into nozzle groups, wherein for each of the nozzle groups the nozzle timing data is equal for all nozzles in said nozzle group.

9. The agricultural device according to claim 1, wherein the at least one pressure regulation unit is configured to temporarily disable one or more of the plurality of nozzles in accordance with an amount of liquid to be sprayed.

10. The agricultural device according to claim 1, wherein the plurality of nozzles comprises duo fan nozzles that comprises a first nozzle head that is configured to spray in a first direction and a second nozzle head that is configured to spray in a second direction, and wherein the first direction is approximately in a forward moving direction of the agricultural device and wherein the second direction is approximately in a backward moving direction of the agricultural device.

11. The agricultural device according to claim 10, wherein the calculation of the nozzle timing data for each associated nozzle further comprises adapting the nozzle timing data to minimize an overlap between a spraying target of the first nozzle head and a spraying target of the second nozzle head.

12. The agricultural device according to claim 1, wherein each of the plurality of nozzles are configured to spray with a non-homogeneous droplet size and wherein the maximum closing time is further determined according to a size of a spraying area corresponding to each of the plurality of nozzles.

13. The agricultural device according to claim 1, wherein the maximum closing time is further determined in accordance to a wind speed and a wind direction.

14. The agricultural device according to claim 1, wherein the at least one nozzle controller comprises a number of electro-valves, wherein each electro-valve is associated with one or a number of nozzles, where each electro-valve is configured for receiving the nozzle timing data for setting the opening and the closing of the associated nozzles.

15. The agricultural device according to claim 14, wherein the electro-valves are controlled with a PWM signal according to a Duty Cycle (DC) formula, wherein the Duty Cycle formula is defined as $DC=T1/(T2+T1)$, wherein T1 is a closing time of a nozzle and T2 is an opening time of the nozzle, and/or wherein each of the plurality of nozzles comprises a coil structure and wherein the at least one nozzle controller is configured to control the opening and closing of the nozzle by switching a direction of electric current through the coil in accordance with the nozzle timing data and wherein each of the plurality of nozzles may further comprise a spring that is configured to assist the closing of said nozzle, and/or wherein each of the plurality of nozzles comprises an opening coil and a closing coil and wherein the at least one nozzle controller is configured to control the opening and closing of the nozzle by alternating between activating the opening coil and activating the closing coil in accordance with the nozzle timing data.

16. The agricultural device according to claim 14, wherein the at least one pressure regulation unit is further configured to observe a current, an electrical resistance and/or the voltage needed to open and/or close the electro-valves and wherein a maintenance signal is presented to a user of the agricultural device when the current, electrical resistance and/or the voltage is outside a predefined range.

17. The agricultural device according to claim 1, wherein the device is a self-propelled vehicle, and wherein the device comprises:
   a number of wheels;
   at least one angle sensor that is operatively connected to a steerable wheel of the number of wheels; and,
   wherein the at least one angle sensor is configured to measure a wheel angle of the associated wheel with respect to a central axis that extends from a rear end to a front end of the vehicle substantially parallel to a moving direction, and wherein the angle data is transmitted to the at least one nozzle controller to be included as calculation input for calculation of the nozzle timing data.

18. The agricultural device according to claim 1, wherein the device is a vehicle to be towed by another vehicle.

19. A method for spraying a field, comprising of providing the agricultural device according to claim 1 and controlling the agricultural device to spray the field.

20. A computer implemented method for controlling an agricultural device according to claim 1, the method comprising the steps of:
   observing an amount of liquid to be sprayed;
   observing a movement speed of the agricultural device;
   calculating nozzle timing data at least comprising a spraying frequency and a maximum closing time in accordance with the observed amount of liquid to be sprayed and the observed movement speed; and
   controlling the opening and closing of the plurality of nozzles in accordance with the nozzle timing data using the at least one pressure regulation unit.

\* \* \* \* \*